April 25, 1939.                    E. MÜLLER                    2,156,060
             SYSTEM FOR DETERMINING POSITIONS BY RADIO BEACONS
                    Filed Dec. 8, 1936           2 Sheets-Sheet 1
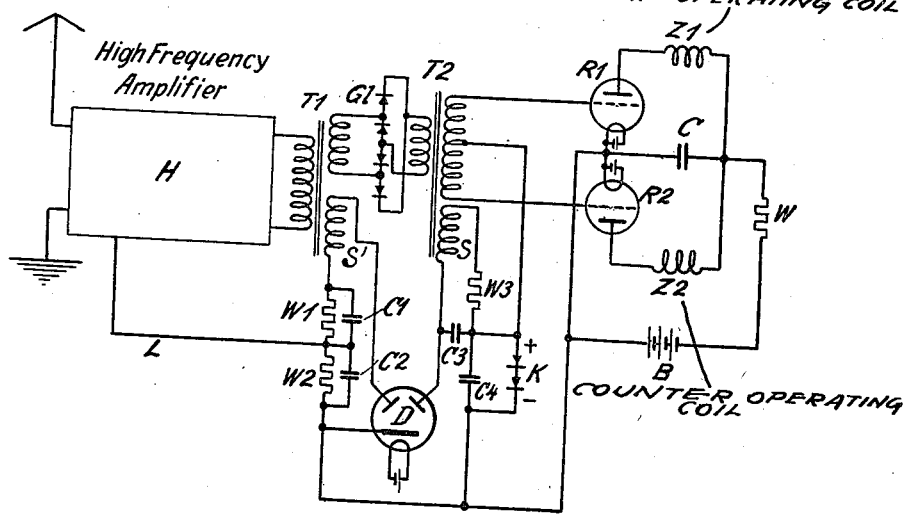
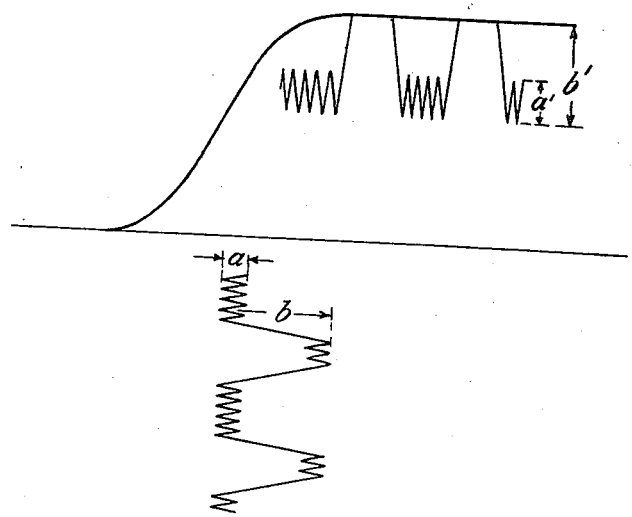
Inventor:
Ernst Müller
by P. C. Hopgood
Attorney

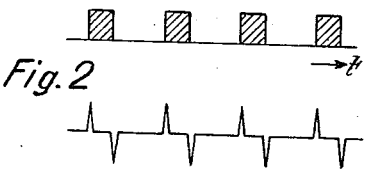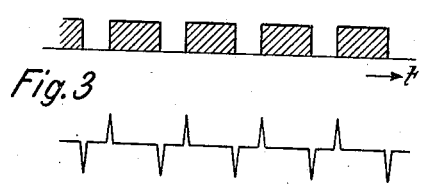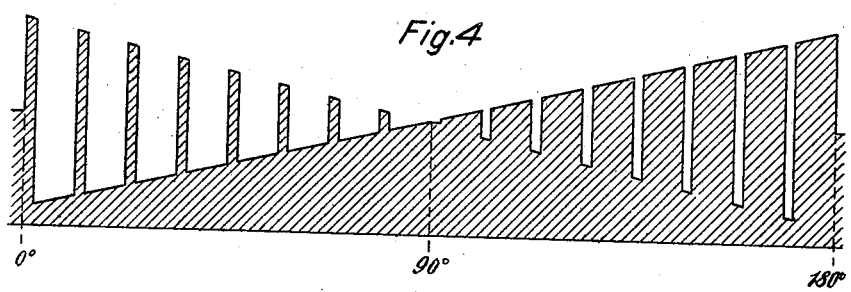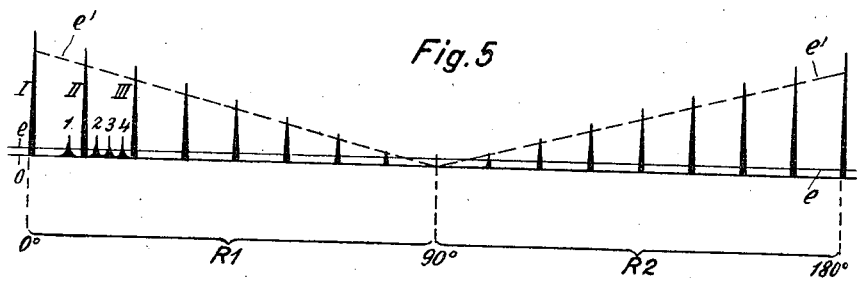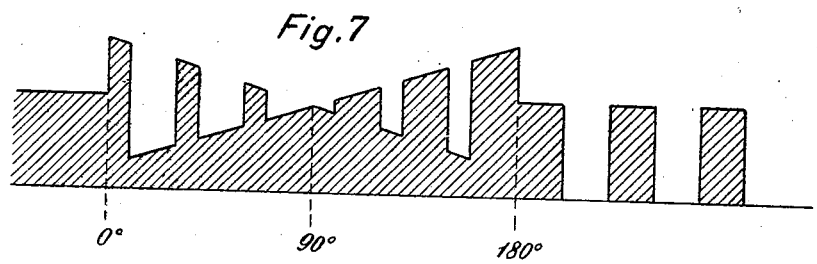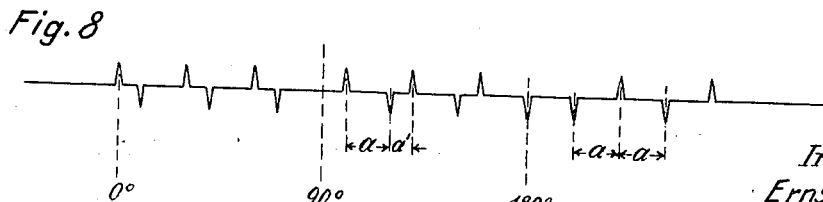

UNITED STATES PATENT OFFICE 2,156,060

SYSTEM FOR DETERMINING POSITIONS BY RADIO BEACONS

Ernst Müller, Berlin-Tempelhof, Germany, assignor to C. Lorenz Aktiengesellschaft, Berlin-Tempelhof, Germany, a company Application December 8, 1936, Serial No. 114,748
In Germany December 12, 1935

12 Claims. (Cl. 250—11)

The present invention relates to a system for determining the bearing of a movable air-craft, vessel or the like with respect to a radio transmission station of the type generally known as a "rotary beacon".

In the type of radio transmitting station known as a "non-rotary beacon" a radiation pattern is produced, which defines a fixed center line extending through the radio station by directively radiating two different signals in such a manner that one of these signals predominates on one side of said center line, while the other signal predominates on the other side of said center line, and said signals are of equal intensity on said center line. Ordinarily these two different signals consist of complementary codes, such as A and N (dot-dash and dash-dot, respectively) or, simply, dots for the signals on one side of the center line and complementary dashes for the signals on the other side of the center line. If the dots, which compose one signal are truly complementary to the dashes, which compose the other signal a continuous dash signal will be heard along the center line where both signals are of equal intensity. Rotary beacons are also known in which the radiation pattern is produced exactly as in the case of a non-rotary beacon, but in which the complete radiation pattern is rotated so that the center line of equal intensity reception of the two signals constantly rotates, and in which the regions of the predominant dot-signals and predominant dash-signals correspondingly rotate. Such rotary beacons also transmit in addition to the rotating radiation pattern consisting of two signals transmitted with different directional characteristics, a non-directional signal which is employed for synchronizing or timing purposes and which is transmitted in all directions at the instant when the center line of the rotating radiation pattern passes through a given direction, such as north. The method hitherto employed for determining the bearing of a movable craft with respect to such a rotary beacon was as follows: The non-directional signal and the two directional signals which form the rotating radiation pattern were both received at the moving craft and the elapsed time between the reception of the non-directional signal and the moment when the center line of the rotating radiation pattern reached the craft was measured by a stop-watch or other means. In order to facilitate the measurement of this time interval it has also been suggested that the number of signals, as for example the number of dots and dashes transmitted from the beacon per second should be definitely related to the rate of rotation of the rotating radiation pattern of this beacon so that for instance fifteen dots and dashes are transmitted during each quadrant of rotation or one signal for each six degrees of rotation.

In the patent application Ser. No. 17,043 filed on April 18, 1935, in the name of E. Kramar, for "Methods for determining positions by radio beacons", a so-called push-pull arrangement is disclosed which comprises grid-controlled gas discharge tubes for counting impulses received for obtaining bearings or determining position in cooperation with the transmitter described above. The grid potential of these two tubes is so adjusted that they are maintained slightly below their ionisation potentials and are caused by the received signals to produce relaxation oscillations, that is oscillations whose graphic representation is saw-tooth shaped in a well known manner.

Such adjustment of the grid potential entails a very high sensitivity to all arriving impulses and thus also to disturbing impulses of any kind. Therefore, the tube arrangement and thus the counting mechanisms included in the anode circuits may happen to be actuated by disturbing-impulses so as to cause errors in counting which render a correct direction finding impossible. In the case of strong impulses the tube actuated by the impulse will be so controlled that its grid potential is shifted far into the positive region, the liability to disturbances thus being invariably great throughout the period of impulse transmission.

The invention serves to limit this liability to disturbances by providing for an additional regulation of the sensitivity of the grid controlled gas discharge tubes, namely a regulation controlled by the impulses.

The invention will be understood from the following description and be particularly pointed out in the appended claims, reference being had to the accompanying drawings in which Fig. 1 is a wiring diagram of one embodiment of a receiving arrangement as provided by the invention. Figs. 2 to 5 are graphic representations relating to the operation of this arrangement. Figs. 6, 7 and 8 are graphic representations which serve to explain a novel mode of operating a radio beacon intended for cooperation with the novel receiver.

The arriving signals, i. e. dots and dashes, are amplified in a high frequency amplifier H and then conveyed over a transformer T1 to a rectifier G1 to which the primary of a transformer T2 is connected. The impulses originating in the secondary of transformer T2 by the continuous-current variations are conducted to the grids of the grid controlled gas discharge tubes R1, R2. In the anode circuit of these tubes counting mechanisms Z1, Z2 are included. The part of the anode circuits which is common to the tubes R1, R2 is provided with a condenser C charged by a battery B over a resistance W. As pointed out in said application Serial No. 17,043, the counters Z1 and Z2 are controlled by the selective ignition of the associated grid controlled gas tubes R1, R2 respectively. Tubes R1, R2 are selectively operable dependent upon the polarity of the initial impulses of a pair of impulses in the secondary of transformer T2. The discrimination between the dot and dash signals is dependent upon the arrangement such that when a dot signal is received, it is converted into two successive impulses the first of which is a positive impulse and the second a negative impulse. By reason of the discharge of the condenser C in the anode circuit, this second impulse of the pair is suppressed. On the other hand, when a dash signal is received, it likewise is converted into a pair of spaced impulses in the secondary of transformer T2 but the first impulse of this pair is negative and the second impulse of this pair is suppressed by means of the discharge of condenser C. Thus a current is set up in the secondary winding of T2 on receipt of dash signal and current of opposite polarity is set up by a dot signal. By this arrangement, it is therefore possible to arrange the circuits so that R1 for example is ignited on receipt of a positive impulse on the grid while R2 is ignited on receipt of a negative impulse. Thus at any given time either the counter Z1 or the counter Z2 is caused to operate.

In accordance with the invention the transformer T2 is on its secondary side equipped with a second winding S which causes the impulses to be rectified in a diode path and acts to charge a condenser C4 in accordance with the magnitude of the impulses. The diode is a duodiode D for a purpose explained hereafter. The potential at C4 forms an additional negative bias for the grids of the tubes R1, R2, this bias controlling the sensitivity of the tubes in accordance with the magnitude of the arriving impulses. Condenser C4 is bridged over by a rectifier K whose polarities are such that the rectified impulses shall pass through the rectifier in the choking direction thereof so as to meet with a high resistance. In the operation of grid controlled gaseous discharge tubes a positive grid charge is produced, as is well known, and this charge must be carried away. In the traversing direction of the rectifier K such charge can flow to the cathode without having to overcome a substantial resistance. Included in the circuit of the said diode path is also a filter chain W3, C3 that serves to clear the impulses of tone frequencies which may still arrive with them.

It is indifferent with respect to the intensity of the regulating voltage whether dots or dashes are transferred, since the number of impulses is the same in both cases. This will appear from Figs. 2 and 3, in which the amplitude of the signals, or the impulse originating on the secondary side of the transformer T2, is plotted with respect to the time $t$. Fig. 2 is to illustrate the conditions under which the transmission of dots is effected. Two impulses in each case are here following upon each other at short intervals. The direction of the first impulse determines the kind of the signal. In the case of dots, for instance, the first impulse is positive and the second is negative. With dashes such as represented in Fig. 3 the first impulse is negative while the second is positive. The described diode path acts to suppress the negative impulses and to rectify the positive ones. From Figs. 2 and 3 it appears that the number of positive impulses is the same for both kinds of signals, the resultant control or regulating voltage hence being likewise the same.

The keying effected in the operation of rotary radio beacons is in a well known manner such that a two-beam beacon, for example, is only keyed during 180° of its rotation, starting from the north-south direction. Fig. 4 represents impulses such as detected by a receiver positioned exactly to the east or west of the transmitter. This means that the number of received dashes is equal to the number of received dots. At the commencement of keying the strong signal impulses are active. Depending upon the rotation of the beam of the radio beacon the signals of one kind, such as the dashes, are becoming less distinguishable from those of the other kind, such as the dots, and finally, after 90° of rotation of the beam, the two kinds of signals intermerge so as to produce the so-called continuous-dash centre-line. On further rotation of the beam the signals of the second kind are received, these now increasing to the maximum value of intensity so as to become more and more distinguishable from the signals of the first kind. Fig. 5 shows impulses of this nature which are originated on the secondary side of the transformer T2 and also illustrates the disturbances that may occur here. From 0° to 90°, when for instance dots are received, tube R1 would respond, while from 90° to 180°, when dashes are received, tube R2 would respond. The disturbances are superimposed upon these impulses and are present also when no impulse arrives. Without an additional regulation as provided by the invention in order to influence the tubes R1, R2, line $e$ would represent the sensitivity of the arrangement of push-pull tubes, that is to say, these tubes would respond if in the graphical representation shown in Fig. 5 the impulses would extend beyond line $e$, no matter whether such impulses are those intended to be received or are disturbing impulses. It is immaterial here how far the impulses extend beyond line $e$. The arrangement can thus be released even by a small disturbing impulse such as that denoted by 1 in Fig. 5, for instance, so that an incorrect counting and therefore errors in direction finding would occur. Peak 1 thus will cause one tube to respond whenever condenser C has been sufficiently charged. As a result, on the arrival of the bearing impulse II condenser C has been discharged, this impulse thus having no effect. One of the next following disturbing impulses 2 to 4 however may again release the arrangement as condenser C then has been sufficiently recharged. Owing to the novel regulation line $e$ is shifted into the position of the broken line $e'$, that is, in the example stated the disturbing impulses 1 to 4 would have no effect and hence the bearing impulses II, III could be counted correctly.

In the case of very powerful impulses the high frequency amplifier of the receiver may happen to be overmodulated so as to alter the ratio of the disturbance to the bearing impulse in such a manner that the disturbances will be more pronounced over the bearing impulses. This is represented in Fig. 6. The disturbances are here shown to have increased in a regular manner whilst the bearing impulses are cut short above, the ratio $a:b$ being no longer equal to the ratio $a':b'$. The liability of the receiver to disturbances is much increased thereby. For this reason, in accordance with a further feature of the invention a regulation of the amplitudes, well known per se, is provided on the high frequency side along with the arrangement by which the impulses are caused to regulate tubes R1, R2. Such amplitude regulation is effected for instance by means of an additional diode path, namely the second path of the duodiode D. This path is attached over series resistances W1, W2 to an additional secondary winding S' of the transformer T1. The resistances W1, W2 are bridged over by condensers C1, C2. From between these resistances a line L extends to the amplifier H in order to regulate this in a well known manner by displacing the grid bias thereof into the region of less slope. The time constant of the resistance arrangement W1, W2 and capacities C1, C2 connected in parallel therewith is so chosen that the regulation is slow to follow the impulses so that the first strong impulse, such as has been assumed in Fig. 4 by way of example, shall not at once cause an efficient decrease in sensitivity of the high frequency amplifier H. The time constant is also such as to be great compared to the impulse frequency and to the revolution frequency of the beam. The time constant of that regulation by which the tubes R1, R2 are influenced is great as compared with the impulse frequency while being small in comparison with the revolution frequency of the beam.

To comprise the diode path for regulating the high frequency amplifier and the diode path for regulating the discharge tubes in one duodiode is practicable because both paths have the same cathode potential and therefore allow of comprising the two cathodes in one.

Instead of such diode paths contact rectifiers may of course be employed.

The described mode of regulating the tubes R1, R2 being effected by means of the arriving impulses is only practicable therefore as long as signals are being received.

Since however, for instance in the case of rotary radio beacons wherein two beams are caused to rotate, keying is only effected heretofore during a half-revolution, the tubes R1, R2 have their full sensitivity during that half-revolution during which no signalling is effected, and will therefore readily respond to disturbing impulses so as to cause the indicating device, described in the said patent application Ser. No. 17,043, to give a wrong indication.

This drawback is overcome in accordance with a further feature of the invention by a certain mode of keying being effected during that half-revolution of the beacon which hitherto has been a period of no keying. This additional keying is made in such a rhythm that the resulting impulses follow upon each other at equally-spaced intervals of time. As a result, the said indicating device will fail to give an indication, its pointer being caused by these impulses to swing about its zero position so as to make, for instance, one step in either direction.

The signals transferred by such additional keying will in the manner before described act on the grid-controlled discharge tubes R1, R2 so as to diminish the sensitivity thereof in accordance with the power of these signals and thus to prevent disturbing impulses not exceeding a certain magnitude from being indicated and recorded.

In Fig. 7 an example of those signals is shown which are keyed when the beacon is rotating from 0° to 180°. By the hatched area the high frequency amplitude is represented. It has been assumed that the receiver is exactly in the east or west position, that is to say, that the continuous-dash-centre-line will strike it after 90° of rotation from the north-direction. In the receiver these signals are rectified after having been amplified, and over a transformer impulses of the kind shown in Fig. 8 are filtered out. By the direction of these impulses the kind of the signal is determined. In accordance with the invention the high frequency amplitude produced between 180° and 360° of rotation is keyed at equal intervals, being preferably controlled downward towards the zero value. This is illustrated in Fig. 7 where the hatched portions likewise represent the radiated high frequency amplitudes. In Fig. 8 the impulses segregated on the receiver side are shown below those emitted on the transmitter side. It will be seen that from 180° to 360° of rotation the distances $a$ between the impulses of different direction are the same throughout, whereas from 0° to 180° the spaces of time $a'$ are different from each other, being in the ratio 1:7, for instance. Owing to the spaces of time equalling each other in the region of 180° to 360° no indication is effected in the receiver since the impulses neutralize each other in their action on the indicating device. This indicating device may be so constructed that for instance after one step made by the counting mechanism the pointer thereof shall stand still.

In this way the receiving arrangement is made insensitive during that period of time which is a period of no keying as regards the signals proper.

What is claimed is:

1. A receiver for the reception of signal modulated high frequency waves radiated from a transmitter which produces a rotating radiation pattern in one region of which signals of a first kind, such as dots predominate, and in another region of which signals of a second kind, such as dashes predominate; said receiver having means to derive separate counting impulses corresponding to said kinds of signals for determining the numerical difference between the said signals and including a plurality of grid controlled gas discharge tubes having a balanced divided input circuit and a divided output circit; and means for regulating the ignition points of said tubes under control of the received signals to prevent disturbing impulses interfering with the proper counting of said signals.

2. A receiver according to claim 1 in which the means for regualting the ignition points includes a rectifier for the received impulses.

3. A receiver according to claim 1 in which the means for regulating the ignition points includes a rectifier for the received impulse; and a grid discharge circuit is provided for said tubes which circuit includes a contact rectifier.

4. A receiver according to claim 1 in which the means for regulating the ignition points includes means to rectify the received impulses; and a grid discharge circuit is provided for said tubes which circuit includes a contact rectifier having a filter chain in circuit with said rectifier for filtering out tone frequencies.

5. A receiver according to claim 1 having a high frequency amplifier and having means to regulate the sensitivity thereof under control of the intensity of the received signals.

6. A receiver according to claim 1 in which the means for regulating the ignition points includes means to rectify the received impulses; and a grid discharge circuit is provided for the grids of said tubes which circuit includes a contact rectifier, a filter chain in the circuit of said rectifier for filtering out tone frequencies; and means for regulating the ignition point of the said tubes, the last-mentioned means having a time constant which is large as compared with the frequency of the received impulses.

7. A receiver according to claim 1 in which the means for regulating the ignition points of said tubes includes diode paths for rectifying the received impulses.

8. A receiver according to claim 1 including a high frequency amplifier and an electron tube, a path through said electron tube for regulating the ignition points of the said gas tubes and the rectifier path through said electron tube for regulating the high frequency amplifier.

9. In a system of the type wherein a transmitter produces a rotating radiation pattern in one region of which signals of a first kind such as dots predominate and in another region of which signals of a second kind such as dashes predominate, the methods of operation which includes receiving said signals to derive indication producing impulses, keying the transmitter during a period of the rotation of the radiation pattern during which the production of the two said kinds of signals is interrupted, the keying being effected so that the impulses produced thereby neutralize each other so far as the production of said indication is concerned.

10. The method of operation according to claim 9 in which the said impulses produced by said keying are equidistant and of the same length.

11. The method of operation according to claim 9 in which the transmitter is keyed downward towards the zero value during a period of the rotation of the radiation pattern during which the production of the two of said kinds of signals is interrupted so that the impulses produced by such keying neutralize each other.

12. The method of operation according to claim 9 in which the said impulses produced by said keying are applied to diminish the sensitivity of the receiver in accordance with the strength of the received signals.

ERNST MÜLLER.